United States Patent
Xiao et al.

(10) Patent No.: US 12,122,265 B2
(45) Date of Patent: Oct. 22, 2024

(54) TRACK ASSEMBLY

(71) Applicant: Lear Corporation, Southfield, MI (US)

(72) Inventors: Fahui Xiao, Shanghai (CN); Jianliang Ma, Shanghai (CN); Hui Zhang, Shanghai (CN); Chao Wang, Shanghai (CN); Chengyuan Liu, Shanghai (CN)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/319,720

(22) Filed: May 13, 2021

(65) Prior Publication Data

US 2021/0354598 A1    Nov. 18, 2021

(30) Foreign Application Priority Data

May 14, 2020    (CN) .......................... 202010407441.9

(51) Int. Cl.
*B60N 2/06* (2006.01)
*B60N 2/07* (2006.01)
*B60N 2/42* (2006.01)

(52) U.S. Cl.
CPC ........... *B60N 2/067* (2013.01); *B60N 2/0705* (2013.01); *B60N 2/0715* (2013.01); *B60N 2/4221* (2013.01); *B60N 2/4228* (2013.01)

(58) Field of Classification Search
CPC .... B60N 2/0232; B60N 2/067; B60N 2/0856; B60N 2/42; B60N 2/4207; B60N 2/4214; B60N 2/4221; B60N 2/4228; B60N 2/43; B60N 2002/0236; B60N 2002/024; B60N 2/0705; B60N 2/0715
See application file for complete search history.

(56) References Cited

U.S. PATENT DOCUMENTS

| | | | |
|---|---|---|---|
| 3,524,677 A * | 8/1970 | Louton, Jr. .......... | B60N 2/0887 248/430 |
| 3,897,101 A | 7/1975 | Hess | |
| 4,204,658 A * | 5/1980 | Courtois ............. | B60N 2/0715 74/533 |
| 4,776,551 A | 10/1988 | Nishino | |

(Continued)

FOREIGN PATENT DOCUMENTS

| CN | 105358368 A | 2/2016 |
|---|---|---|
| CN | 110435488 A | 11/2019 |

(Continued)

OTHER PUBLICATIONS

German Office Action dated Nov. 2, 2021 related to corresponding German Patent Application No. 10 2021 112 264.3.

(Continued)

*Primary Examiner* — Jonathan Liu
*Assistant Examiner* — Guang H Guan
(74) *Attorney, Agent, or Firm* — Fishman Stewart PLLC (57) ABSTRACT

A track assembly includes a track and a support member connected to and configured move along the track. The support member may include an engagement portion. The engagement portion may be configured to engage the track to limit relative movement between the track and the support member in a loaded state of the track assembly. The engagement portion may be configured not to operatively engage the track or limit movement between the track and the support member in an unloaded state of the track assembly.

20 Claims, 10 Drawing Sheets

(56) References Cited

U.S. PATENT DOCUMENTS

| | | | | |
|---|---|---|---|---|
| 4,804,229 | A | 2/1989 | Nishino | |
| 4,949,931 | A * | 8/1990 | Fujiwara | B60N 2/0818 248/429 |
| 5,106,144 | A | 4/1992 | Hayakawa et al. | |
| 5,158,338 | A * | 10/1992 | Hayakawa | B60N 2/366 297/335 |
| 5,732,923 | A | 3/1998 | Tame | |
| 5,755,422 | A * | 5/1998 | Susko | B60N 2/073 248/430 |
| 5,785,292 | A | 7/1998 | Muraishi et al. | |
| 5,800,015 | A | 9/1998 | Tsuchiya et al. | |
| 5,813,726 | A | 9/1998 | Husted | |
| 6,352,312 | B1 * | 3/2002 | Rees | B60N 2/072 297/216.16 |
| 6,488,249 | B1 | 12/2002 | Girardi et al. | |
| 6,612,647 | B1 | 9/2003 | Munch et al. | |
| 6,666,508 | B1 | 12/2003 | Hofmann et al. | |
| 7,195,311 | B2 | 3/2007 | Kuliha et al. | |
| 7,669,929 | B2 | 3/2010 | Simon et al. | |
| 8,033,589 | B2 * | 10/2011 | Kusanagi | B60N 2/045 296/68.1 |
| 8,061,756 | B2 | 11/2011 | Kimata et al. | |
| 8,708,299 | B2 | 4/2014 | Kitamura et al. | |
| 8,814,122 | B2 | 8/2014 | Couasnon | |
| 9,132,750 | B2 | 9/2015 | Jahner et al. | |
| 9,321,380 | B2 | 4/2016 | Ferenc et al. | |
| 9,579,997 | B2 | 2/2017 | Eckhoff et al. | |
| 9,827,879 | B2 * | 11/2017 | Fujita | B60N 2/0881 |
| 10,059,230 | B2 * | 8/2018 | Kume | A47C 1/12 |
| 10,518,668 | B2 | 12/2019 | Schueler | |
| 10,538,177 | B2 | 1/2020 | Runde | |
| 10,583,752 | B2 * | 3/2020 | Higuchi | B60N 2/0232 |
| 10,688,895 | B2 | 6/2020 | Emrich et al. | |
| 10,759,311 | B2 | 9/2020 | Petit et al. | |
| 10,857,910 | B2 * | 12/2020 | Madhu | B60N 2/123 |
| 10,882,425 | B2 | 1/2021 | Emrich et al. | |
| 10,889,207 | B2 | 1/2021 | Emrich et al. | |
| 10,919,415 | B2 | 2/2021 | Emrich et al. | |
| 11,110,822 | B2 * | 9/2021 | Hattori | B60N 2/0727 |
| 11,345,259 | B2 * | 5/2022 | Marini | B60N 2/43 |
| 11,577,630 | B2 * | 2/2023 | Komiyama | B60N 2/0705 |
| 2002/0033625 | A1 | 3/2002 | Goy et al. | |
| 2006/0049682 | A1 * | 3/2006 | Yamanaka | B60N 2/0715 297/452.18 |
| 2015/0035327 | A1 | 2/2015 | Ferenc et al. | |
| 2015/0069807 | A1 | 3/2015 | Kienke | |
| 2016/0107549 | A1 | 4/2016 | Janicek et al. | |
| 2016/0114703 | A1 | 4/2016 | Fujita | |
| 2017/0184151 | A1 * | 6/2017 | Huang | F16C 29/02 |
| 2019/0084453 | A1 | 3/2019 | Petit et al. | |
| 2019/0337413 | A1 | 11/2019 | Romer | |
| 2020/0108737 | A1 | 4/2020 | Runde et al. | |
| 2020/0130538 | A1 | 4/2020 | Emrich et al. | |
| 2020/0207242 | A1 | 7/2020 | Petit | |
| 2020/0339017 | A1 | 10/2020 | Schueler | |
| 2021/0138933 | A1 | 5/2021 | Marini | |
| 2021/0354598 | A1 * | 11/2021 | Xiao | B60N 2/067 |
| 2021/0394647 | A1 * | 12/2021 | Shim | B60N 2/0232 |

FOREIGN PATENT DOCUMENTS

| | | | |
|---|---|---|---|
| CN | 110901478 | A | 3/2020 |
| DE | 3613832 | A1 | 10/1987 |
| DE | 3915816 | A1 | 11/1990 |
| DE | 4123102 | A1 | 1/1993 |
| DE | 4125247 | A1 | 1/1993 |
| DE | 19928813 | C1 | 12/2000 |
| DE | 10046204 | A1 | 6/2002 |
| DE | 10201092 | A1 | 7/2003 |
| DE | 102006005966 | A1 | 8/2007 |
| DE | 102006048094 | A1 | 4/2008 |
| DE | 202007004524 | U1 | 8/2008 |
| DE | 202007006446 | U1 | 9/2008 |
| DE | 102013002303 | A1 | 8/2013 |
| DE | 102012214494 | A1 | 2/2014 |
| DE | 102006055267 | B4 | 9/2017 |
| DE | 102017213881 | A1 | 2/2018 |
| DE | 202019101906 | U1 | 4/2019 |
| DE | 202020100685 | U1 | 12/2020 |
| DE | 102019213935 | B4 | 5/2021 |
| DE | 102021106279 | A1 | 5/2021 |
| EP | 0242859 | A2 | 10/1987 |
| EP | 416303 | A2 | 3/1991 |
| EP | 481578 | A1 | 4/1992 |
| EP | 0900689 | A1 | 3/1999 |
| EP | 3290261 | A1 | 3/2018 |
| EP | 3385112 | A1 | 10/2018 |
| EP | 3456579 | A1 | 3/2019 |
| FR | 2762814 | A1 | 11/1998 |
| FR | 2876064 | B1 | 8/2008 |
| FR | 2901192 | B1 | 3/2009 |

OTHER PUBLICATIONS

Chinese Office Action dated Dec. 29, 2022 for Chinese Patent Application No. 202010407441.9.

Chinese Office Action dated Jul. 3, 2023 related to Chinese Patent Application No. 202010407441.9.

Chinese Office Action dated Jan. 9, 2024 related to Chinese Patent App. No. 202010407441.9 (w_translation).

* cited by examiner

TRACK ASSEMBLY

CROSS-REFERENCE TO RELATED APPLICATION

This application claims priority to Chinese Patent Application 2020104074419, filed on May 14, 2020, the disclosure of which is hereby incorporated by reference in its entirety as though fully set forth herein.

TECHNICAL FIELD

The present disclosure generally relates to track assemblies, including track assemblies that may be used in connection with seats and/or vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assemblies may not be configured to limit movement in loaded conditions, may be complex, and/or may not be efficient There is a desire for solutions/options that minimize or eliminate one or more challenges or shortcomings of track assemblies. The foregoing discussion is intended only to illustrate examples of the present field and should not be taken as a disavowal of scope.

SUMMARY

In embodiments, a track assembly may include a track and a support member connected to and configured move along the track. The support member may include an engagement portion. The engagement portion may be configured to engage the track to limit relative movement between the track and the support member in a loaded state of the track assembly. The engagement portion may be configured not to operatively engage the track or limit movement between the track and the support member in an unloaded state of the track assembly.

With embodiments, a method of operating a track assembly may include controlling movement of a support member along a track via a motor connected to the support member in an unloaded state of the track assembly, and/or limiting movement of the support member relative to the track in a loaded state via an engagement portion at least partially engaging the track.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
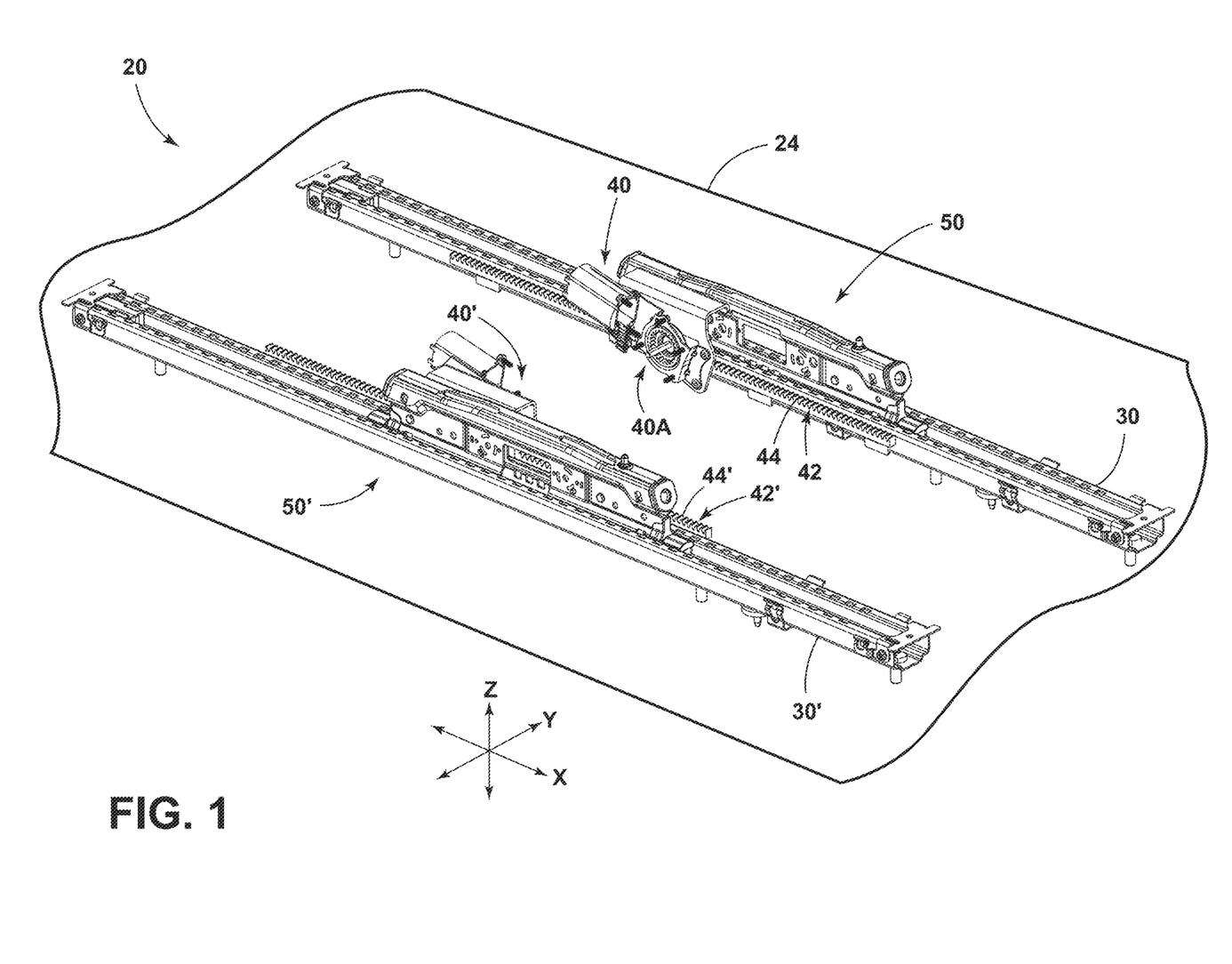
FIG. 1 is a perspective view generally illustrating an embodiment of a track assembly according to teachings of the present disclosure.
Figure 2:
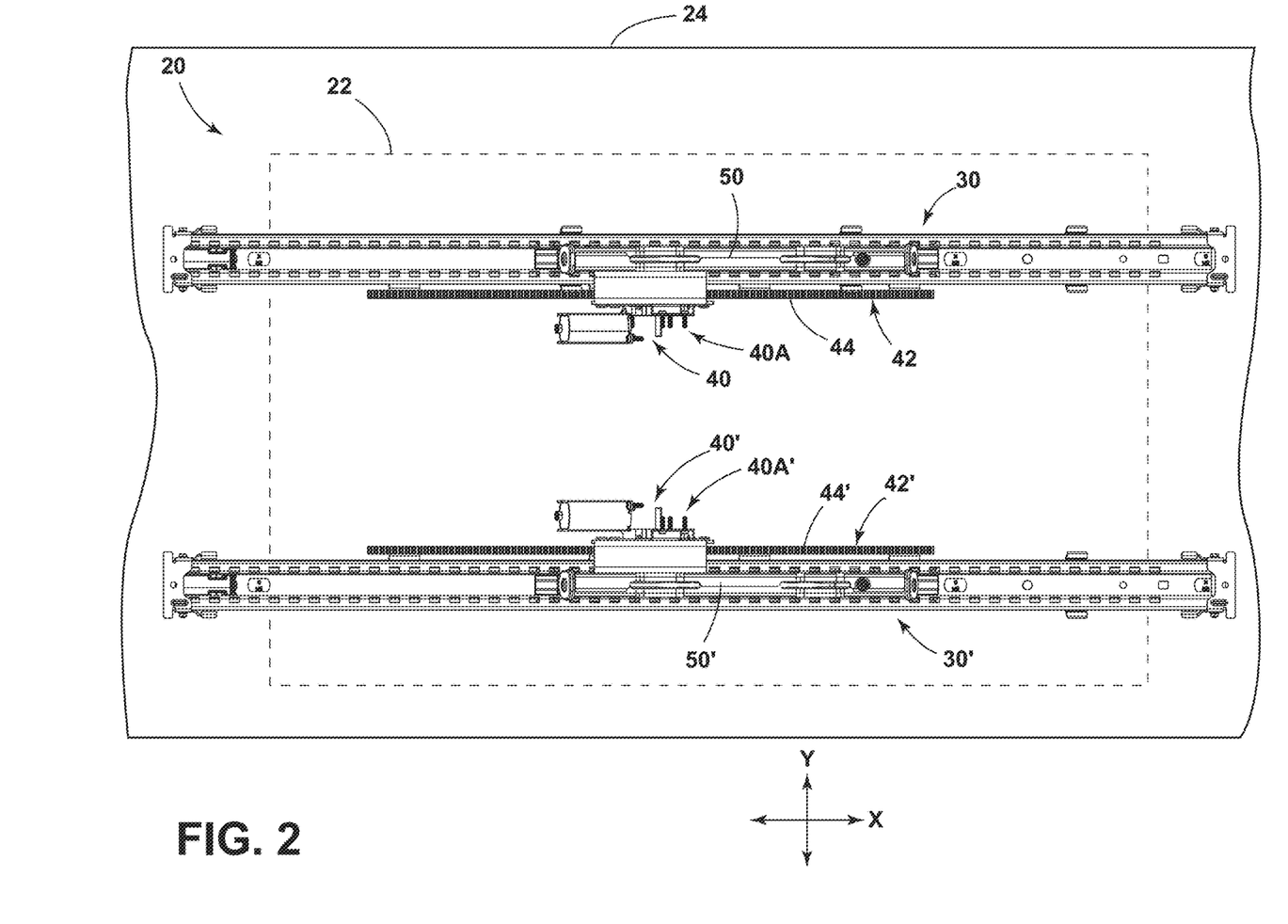
FIG. 2 is a top view generally illustrating an embodiment of a track assembly according to teachings of the present disclosure.

In embodiments, such as generally illustrated in FIGS. 1 and 2, a track assembly 20 may include a first track 30, a second track 30', a first motor 40, a second motor 40', a first support member 50, and/or a second support member 50'. The first support member 50 and/or the first motor 40 may be configured to move relative to/along the first track 30. The second support member 50' and/or the second motor 40' may be configured to move relative to/along the second track 30'. The first support member 50 and/or the second support member 50' may be connected to a seat 22 such that the first motor 40 and/or the second motor 40' may move the seat 22 along the first track 30 and/or the second track 30'. The first support member 50 may be connected to the second support member 50' via a seat 22 and/or a vehicle component. The first support member 50 may be configured to move with the second support member 50'. The track assembly 20 may be configured to be disposed within a vehicle, and/or may, for example, be configured to limit the effects of a vehicle crash.

With embodiments, such as generally illustrated in FIGS. 1 and 2, the first track 30 and/or the second track 30' may be connected to a mounting surface 24 (e.g., a vehicle floor). The first track 30 may be disposed substantially parallel to the second track 30' such that a seat 22 may be connected to both of the first track 30 and the second track 30'. The first track 30 and/or the second track 30' may extend substantially in an X-direction. The first track 30 may be configured to at least partially receive the first support member 50, and/or the second track 30' may be configured to at least partially receive the second support member 50'. The first track 30 and/or the second track 30' may be configured to receive the first support member 50 and/or the second support member 50' substantially in an X-direction.

In embodiments, such as generally illustrated in FIGS. 1 and 2, the first motor 40 may be connected to the first support member 50 and/or the first track 30. The second motor 40' may be connected to the second support member 50' and/or the second track 30'. The motors 40, 40' may be disposed substantially at or on the inner sides of the tracks 30, 30'. For example and without limitation, the motors 40, 40' may be connected (e.g., fixedly attached) to the inner sides of the support members 50, 50', respectively. When the motors 40, 40' are actuated, the support members 50, 50' and/or the seat 22 may move together (e.g., in an X-direction) with respect to the first track 30 and/or the second track 30'.

With embodiments, the first track 30 may include a first drive portion 42 and/or the second track 30' may include a second drive portion 42'. The first drive portion 42 and/or the second drive portion 42' maybe connected to/extend from the first track 30 and/or the second track 30', respectively. The drive portions 42, 42' may, for example, be connected to inner sides of the first track 30 and/or the second track 30'. The first drive portion 42 and/or the second drive portion 42' may extend substantially in an X-direction (e.g., substantially parallel to the first track 30 and/or the second track 30'). The first drive portion 42 may include a first plurality of teeth 44, and/or the second drive portion 42' may include a second plurality of teeth 44'. For example and without limitation, the first drive portion 42 and/or the second drive portion 42' may be configured as a gear rack. The first motor 40 may be configured to at least partially engage the first plurality of teeth 44 of the first drive portion 42 to move the first support member 50 along the first track 30. For example and without limitation, as the first motor 40 is actuated, an output portion 40A (e.g., output shaft, drive shaft, transmission, gearbox, etc.) of the first motor 40 may rotate and engage the first plurality of teeth 44 of the first drive portion 42, which may cause the support member 50 to move along the first track 30. An output portion 40A' of the second motor 40' may be configured to at least partially engage the second plurality of teeth 44' of the second drive portion 42' to move the second support member 50' along the second track 30', such as in the same or a similar manner as the output portion 40A of the first motor 40. For example and without limitation, as the second motor 40' is actuated, the output portion 40A' may rotate and engage the second plurality of teeth 44' of the second drive portion 42', which may cause the support member 50' to move along the second track 30'. The first drive portion 42 and/or the second drive portion 42' may not be configured to move with respect to the first track 30 and/or the second track 30' (e.g., the first drive portion 42 may be fixed to the first track 30 and/or the second drive portion 42' may be fixed to the second track 30').

Figure 3:
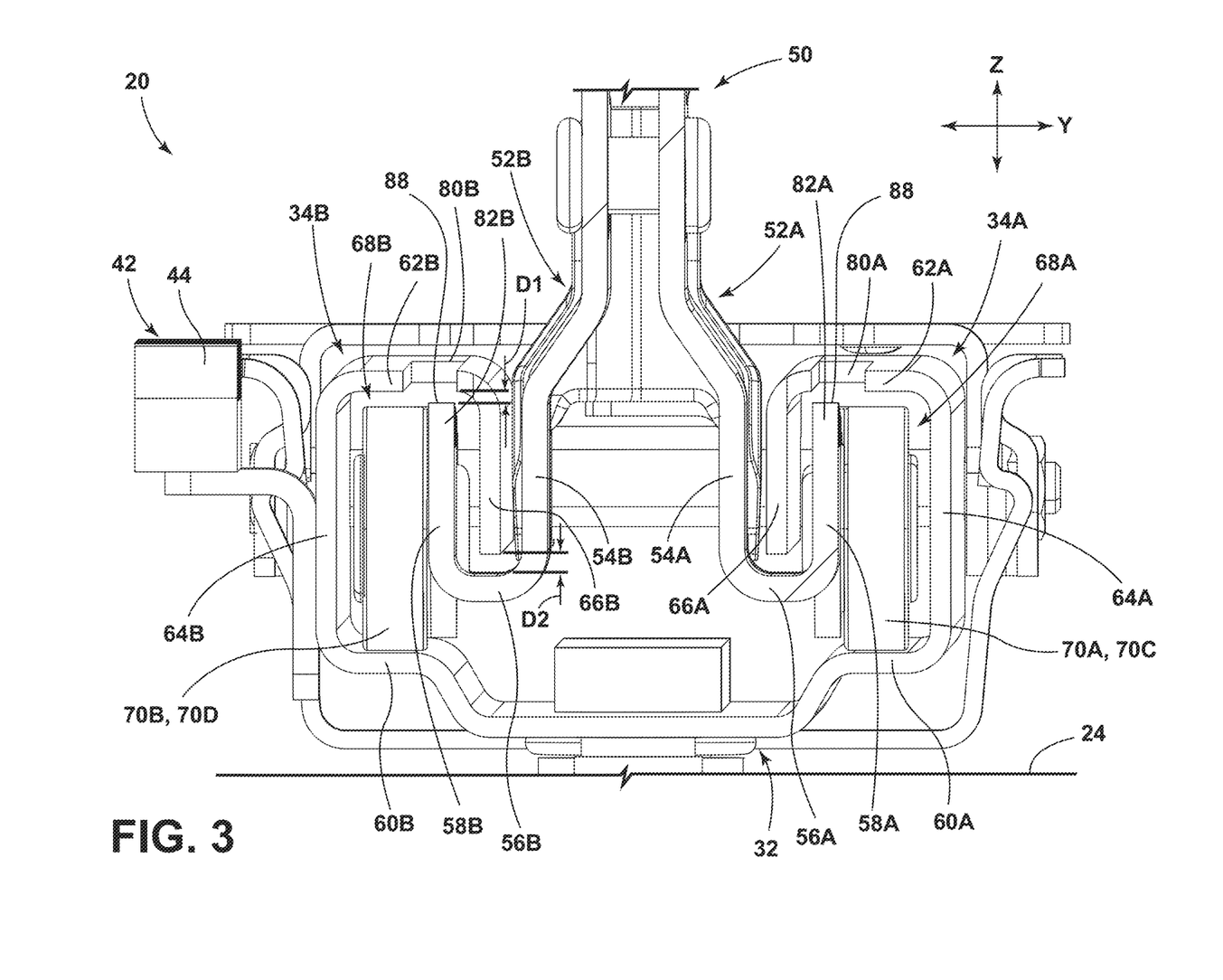
FIG. 3 is an end view generally illustrating portions of an embodiment of a track assembly in an unloaded state according to teachings of the present disclosure.

With embodiments, such as generally illustrated in FIG. 3, the first track 30 and/or the second track 30' may be configured to receive at least a portion of the first support member 50 and/or the second support member 50'. The tracks 30, 30' may include one or more of a variety of shapes, sizes, and/or configurations. For example and without limitation, the tracks 30, 30' may be substantially U-shaped. The tracks 30, 30' may include a base portion 32, a first side portion 34A, and/or a second side portion 34B. The first track 30 may be configured in a substantially similar manner as the second track 30'. The base portion 32 may be connected to the first side portion 34A and/or the second side portion 34B to form a generally U-shaped configuration. The side portions 34A, 34B may include a first horizontal portion 60A, 60B, a second horizontal portion 62A, 62B, a first vertical portion 64A, 64B, and/or a second vertical portion 66A, 66B, respectively. The first horizontal portion 60A, 60B may be connected to/extend from the first vertical portion 64A, 64B, the first vertical portion 64A, 64B may be connected to/extend from the second horizontal portion 62A, 62B, and/or the second horizontal portion 62A, 62B may be connected to the second vertical portion 66A, 66B. The first horizontal portion 60A, 60B may be disposed substantially below the second horizontal portion 62A, 62B (e.g., in a Z-direction), and/or the first vertical portion 64A, 64B may be offset from the second vertical portion 66A, 66B (e.g., in a Y-direction). The first vertical portion 64A, 64B, the second vertical portion 66A, 66B, the first horizontal portion 60A, 60B, and/or the second horizontal portion 62A, 62B may define a recess/channel 68A, 68B that may be configured to at least partially receive the first support member 50. The recess/channel 68A, 68B may, for example and without limitation, include a generally rectangular configuration that may including an opening that opens generally inward, such as to receive the support member 50.

In embodiments, such as generally illustrated in FIG. 3, a first support member 50 may include a first engagement portion 52A and/or a second engagement portion 52B. The first engagement portion 52A may be configured to be disposed substantially proximate the first side portion 34A (e.g., in a Y-direction and/or a Z-direction), and/or the second engagement portion 52B may be configured to be disposed substantially proximate the second side portion 34B (e.g., in a Y-direction and/or a Z-direction). The engagement portions 52A, 52B may include a first vertical portion 54A, 54B, a horizontal portion 56A, 56B, and/or a second vertical portion 58A, 58B, respectively. The first vertical portion 54A, 54B may be connected to/extend from the horizontal portion 56A, 56B, and/or the horizontal portion 56A, 56B may be connected to/extend from the second vertical portion 58A, 58B, such as in a generally U-shaped configuration that opens upward and/or that may be generally complementary to the shape of the recess/channel 68A, 68B. The horizontal portion 56A, 56B may extend substantially in the Y-direction from the first vertical portion 54A, 54B, and/or the second vertical portion 58A, 58B may extend substantially in the Z-direction from the horizontal portion 56A, 56B.

While portions may be described as a vertical portion or a horizontal portion, the terms vertical and horizontal are provided for illustrative purposes and do not limit the configurations of such portions. For example and without limitation, vertical portions may not be completely vertical and/or horizontal portions may not be completely horizontal.

With embodiments, such as generally illustrated in FIG. 3, a support member 50, 50' may include one or more rolling members 70A, 70B, 70C, 70D that may be connected to the second vertical portions 58A, 58B. The one or more rolling members 70A, 70B, 70C, 70D may be configured to facilitate movement (e.g., sliding, rolling, etc.) of the first support member 50 along the first track 30. For example and without limitation, as the motor 40 rotates and engages the plurality of teeth 44, the rolling members 70A, 70B, 70C, 70B may roll along the first horizontal portions 60A, 60B such that the first support member 50 may roll along the first track 30 (e.g., in an X-direction). The first support member 50 may be configured to include a first rolling member 70A, a second rolling member 70B, a third rolling member 70C, and/or a fourth rolling member 70D. The first support member 50 may be configured substantially similar to the second support member 50'.

In embodiments, the rolling members 70A, 70B, 70C, 70D may be disposed substantially vertically (e.g., in the Z-direction) between the first horizontal portions 60A, 60B and the second horizontal portions 62A, 62B of the first track 30. The rolling members 70A, 70B, 70C, 70D may be disposed horizontally (e.g., in the Y-direction) between the first vertical portions 64A, 64B and the second vertical portions 66A, 66B of the first track 30. The second vertical portions 58A, 58B of the engagement portions 52A, 52B and/or the rolling members 70A, 70B, 70C, 70D may be configured to be at least partially disposed in the recesses/channels 68A, 68B. The rolling members 70A, 70B, 70C, 70D may be configured to contact/roll along the first horizontal portions 60A, 60B of the side portions 34A, 34B of the first track 30 (e.g., as the support members 50, 50' move along the tracks 30, 30'). The rolling members 70A, 70B, 70C, 70D may be disposed at least partially horizontally (e.g., in the Y-direction) between the second vertical portion 58A, 58B of the engagement portions 52A, 52B and the first vertical portion 64A, 64B of the first track 30. The rolling members 70A, 70B, 70C, 70D may include one or more of a variety of materials, such as, for example and without limitation, a plastic, a polymer, and/or a metal.

Figure 4:
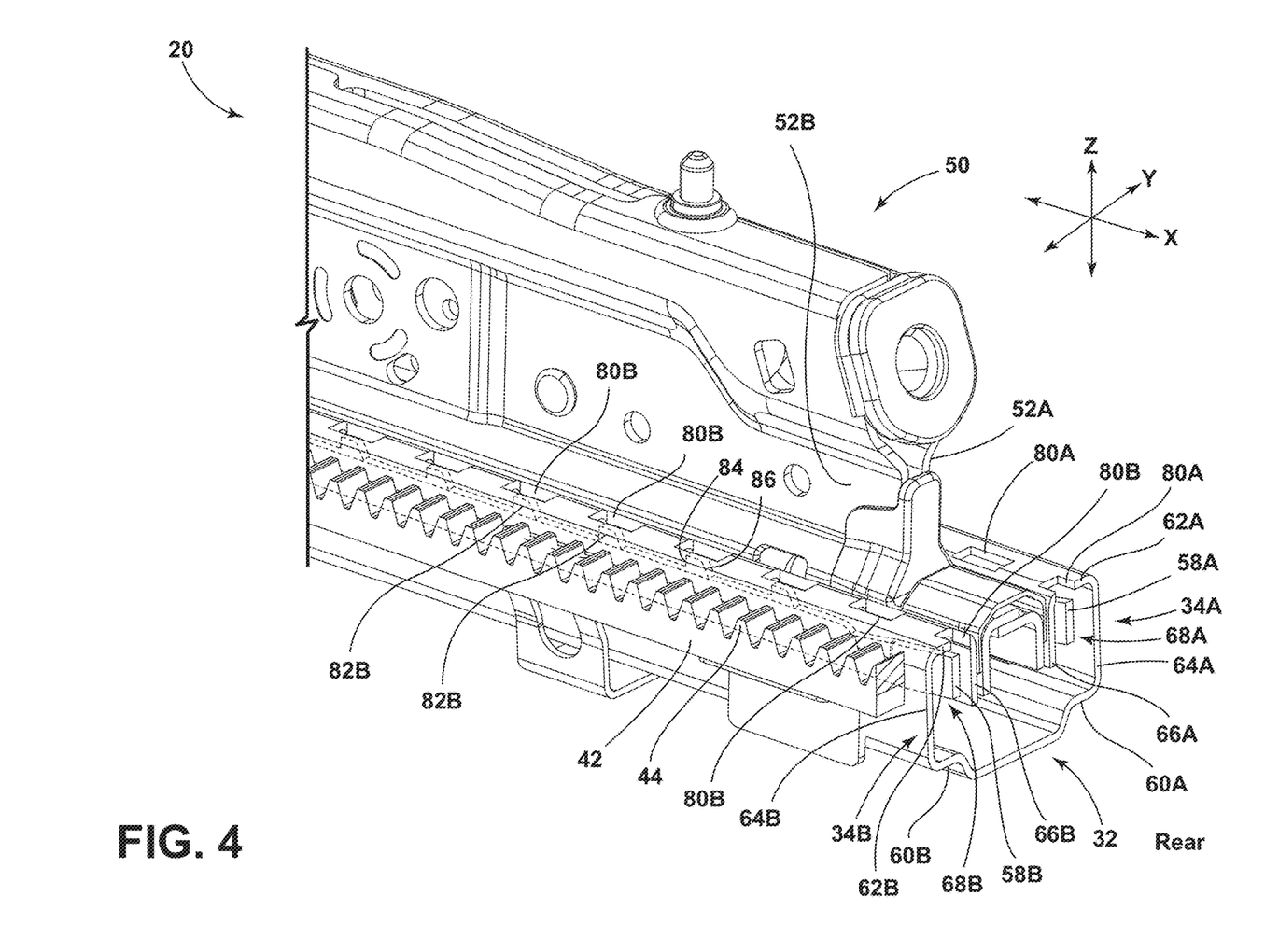
FIG. 4 is a perspective view generally illustrating portions of an embodiment of a track assembly according to teachings of the present disclosure.
Figure 5:
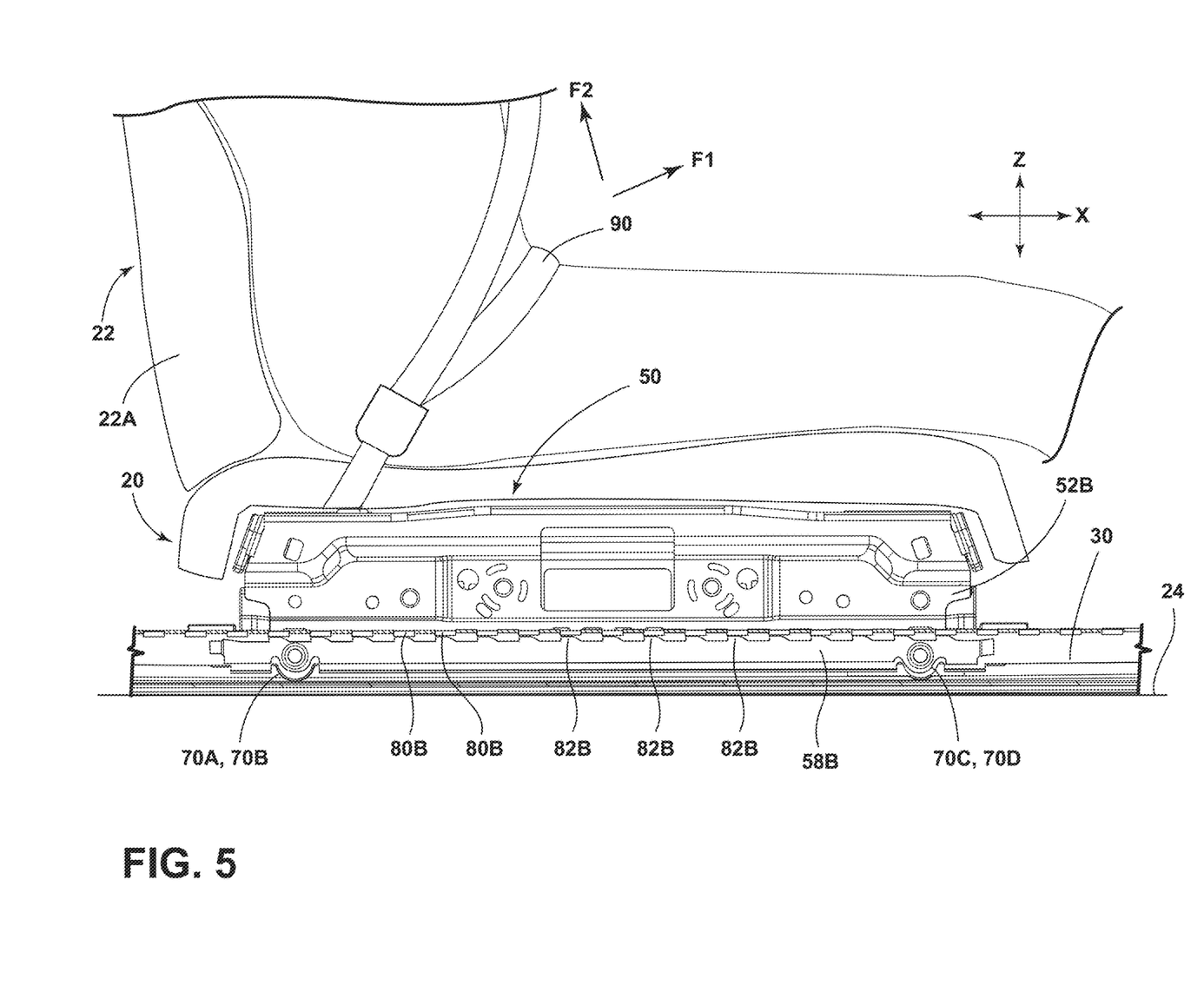
FIG. 5 is a cross-sectional view generally illustrating portions of an embodiment of a track assembly in an unloaded state according to teachings of the present disclosure.

In embodiments, such as generally illustrated in FIGS. 4 and 5, the second horizontal portion 62A, 62B of the side portion 34A, 34B of the track 30 may include a plurality of apertures/recesses 80A, 80B. For example, the second horizontal portion 62A of the first side portion 34A may include a first plurality of apertures 80A, and/or the second horizontal portion 62B of the second side portion 34B may include a second plurality of apertures 80B. The pluralities of apertures 80A, 80B may extend substantially in the X-direction along the length of the first track 30 (e.g., may extend substantially along the length of the first track 30 and/or may extend along a portion of the length of the first track 30). The pluralities of apertures 80A, 80B may include one or more of a variety of shapes, sizes, and/or configurations. For example, the apertures 80A, 80B may be substantially rectangular. The pluralities of apertures 80A, 80B may be configured for vertically (e.g., in a Z-direction) receiving at least a portion of the first support member 50.

With embodiments, such as generally illustrated in FIGS. 4 and 5, the engagement portions 52A, 52B of the first support member 50 may include a first plurality of teeth 82A and/or a second plurality of teeth 82B. The first plurality of teeth 82A may extend substantially in the Z-direction from the second vertical portion 58A of the first support member 50, and/or the second plurality of teeth 82B may extend substantially in the Z-direction from the second vertical portion 58B of the first support member 50. The first plurality of teeth 82A and/or the second plurality of teeth 82B may include one or more shapes, sizes, and/or configurations. For example and without limitation, one or more teeth 82A, 82B may be substantially ramp-shaped, rectangular, trapezoidal, and/or polygonal. The teeth 82A, 82B may include a first surface 84 and/or a second surface 86.

The first surface 84 may be substantially vertical (e.g., parallel to the Z-direction), and/or the second surface 86 may be substantially ramped (e.g., sloped in an X-Z plane). The teeth 82A, 82B may extend along the second vertical portion 58A, 58B for substantially the length of the first support member 50 and/or for a portion of the length of the first support member 50. The first plurality of teeth 82A and/or the second plurality of teeth 82B may, for example and without limitation, be substantially perpendicular to the Y-direction.

Figure 6A:
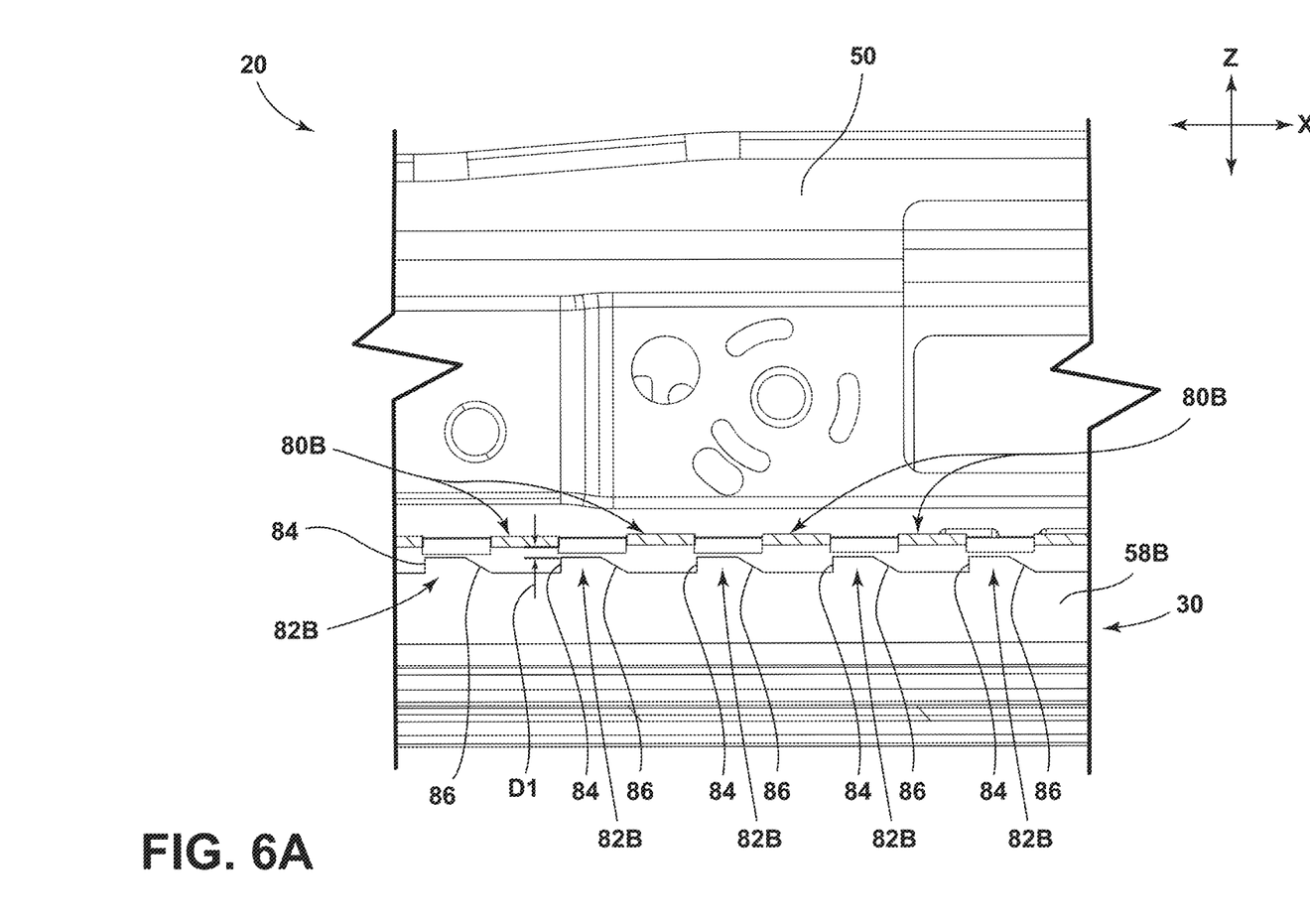
FIG. 6A is an enlarged cross-sectional view generally illustrating portions of an embodiment of a track assembly in an unloaded state according to teachings of the present disclosure.

In embodiments, such as generally illustrated in FIGS. 5 and 6A, a track assembly 20 may include an unloaded position/state, which may correspond to a non-crash state and/or a state in which forces/loads applied to the track assembly 20 may be at or below a threshold. When the track assembly 20 is in the unloaded state, the pluralities of teeth 82A, 82B and/or the pluralities of apertures 80A, 80B may be configured not to materially/operatively limit movement of the first support member 50 with respect to the first track 30. For example and without limitation, during use and/or operation of the seat 22 in an unloaded state, the teeth 82A, 82B may not operatively engage the apertures 80A, 80B, and/or the first motor 40 may be configured to control movement of the first support member 50 along the first track 30 (see, e.g., FIGS. 1 and 2).

With embodiments, the first motor 40 may be configured to limit movement of the first support member 50 up to about 20 KN of force (e.g., may provide a holding force of about 20 KN). When the track assembly 20 is in the unloaded state, an upper surface/portion 88 of the teeth 82A, 82B may be disposed below the horizontal portion 62A, 62B of the first support member 50 (e.g., in the Z-direction). For example and without limitation, when the track assembly 20 is in the unloaded state, the teeth 82A, 82B may be disposed at a first distance D1 away from the second horizontal portion 62A, 62B (e.g., in the Z-direction), such as generally illustrated in FIGS. 5 and 6A. The first distance D1 may, for example and without limitation, be about 1.0 mm or more or less, such as about 0.9 mm or less. The first distance D1 may be large enough to compensate for manufacturing variances of the track assembly 20 while preserving a separation (e.g., in the Z-direction) between the teeth 82A, 82B and the apertures 80A, 80B in an unloaded state. In embodiments, the horizontal portions 56A, 56B may be spaced, in an unloaded state, from the bottoms of the second vertical portions 66A, 66B by a distance D2 that may be greater than the distance D1 such that the teeth 82A, 82B may move at least partially into the apertures 80A, 80B before the horizontal portions 56A, 56B contact the bottoms of the vertical portions 66A, 66B (see, e.g., FIG. 3). The distance D2 may, for example and without limitation, be about 2.5 mm, such as about 2.6 mm, or more or less, in an unloaded state.

Figure 6B:
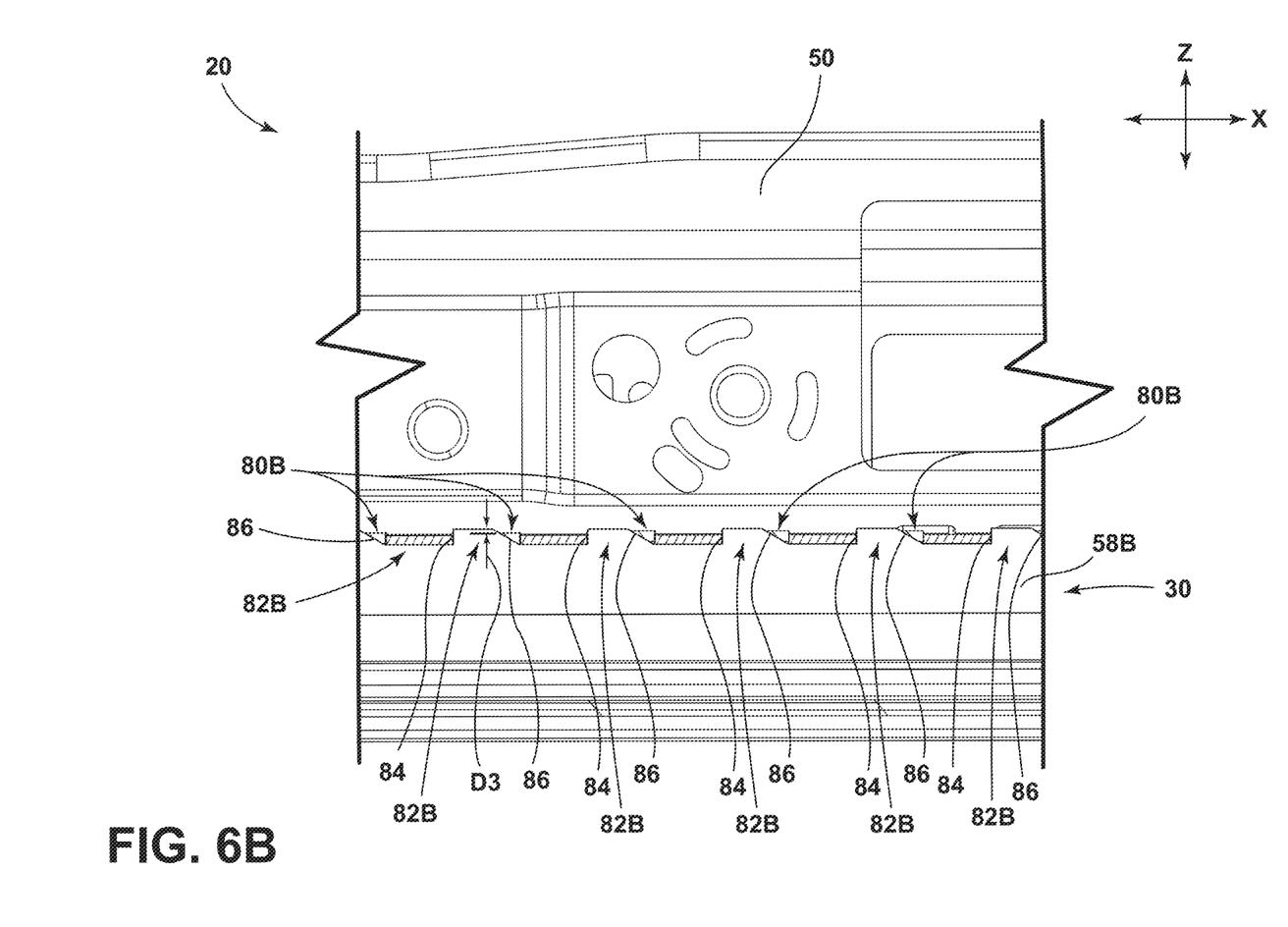
FIG. 6B is an enlarged cross-sectional view generally illustrating portions of an embodiment of a track assembly in a loaded state according to teachings of the present disclosure.
Figure 7:
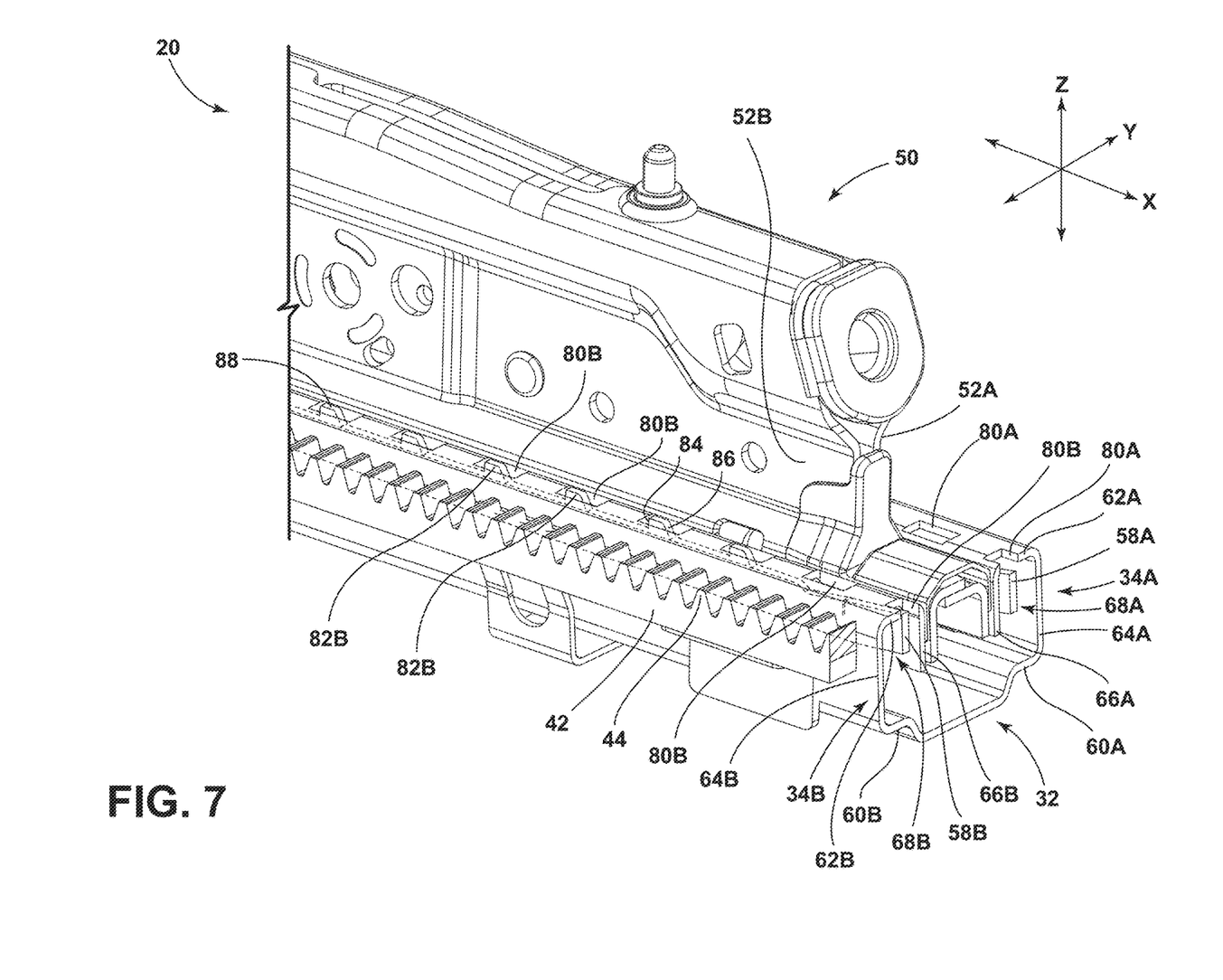
FIG. 7 is a perspective view generally illustrating portions of an embodiment of a track assembly in a loaded state according to teachings of the present disclosure.
Figure 8:
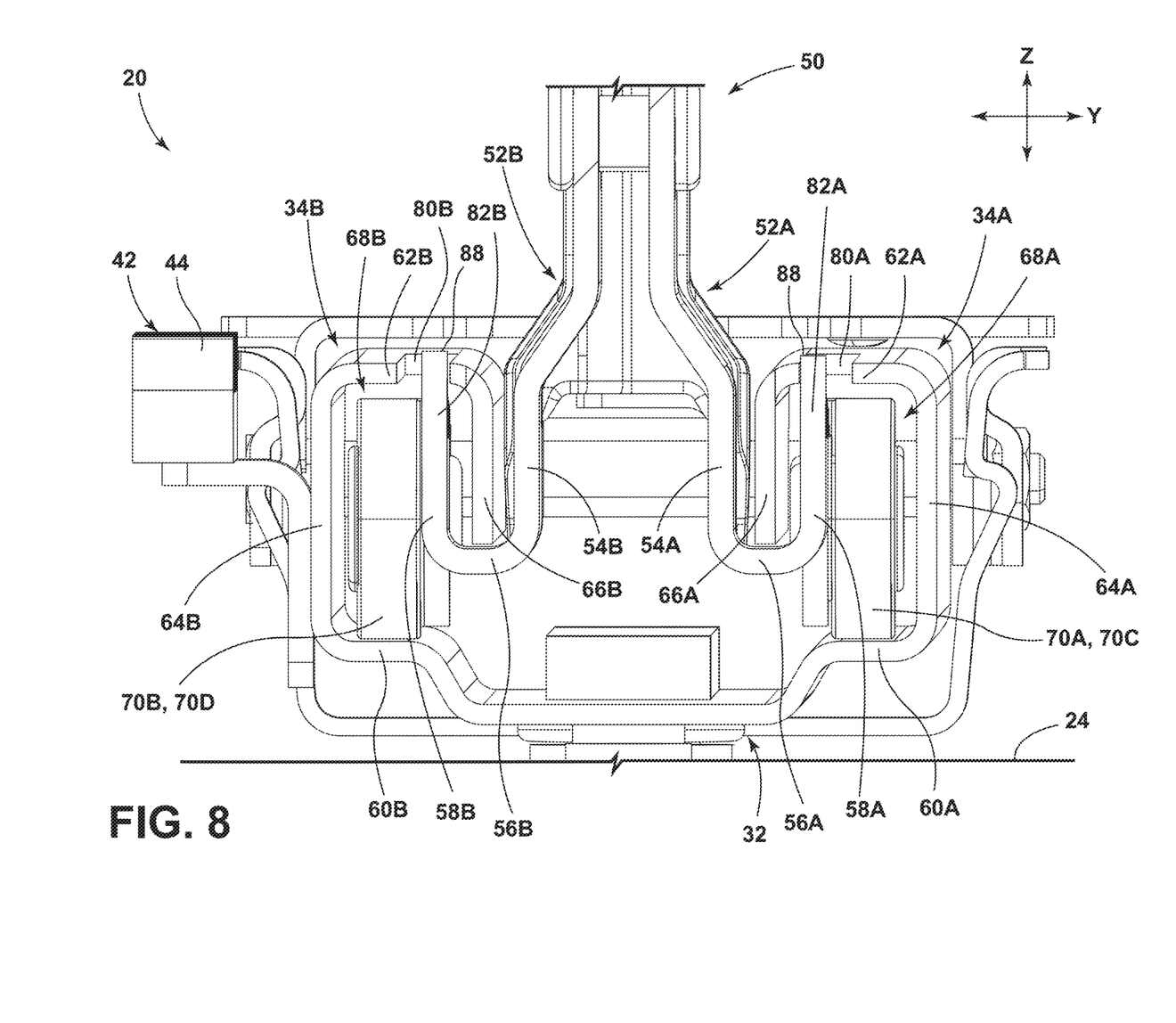
FIG. 8 is an end view generally illustrating portions of an embodiment of a track assembly in a loaded state according to teachings of the present disclosure.

With embodiments, such as generally illustrated in FIGS. 6B, 7, and 8, a track assembly 20 may include a loaded position/state, which may correspond to a crash event (e.g., vehicle collision) or other loading event (e.g., rapid acceleration/deceleration) in which forces above the threshold are applied to the track assembly 20. The track assembly 20 may transition from the unloaded state to the loaded state as a result of such a loading event. For example and without limitation, as generally illustrated FIG. 5, in the event of a front-end collision or significant deceleration, an occupant of the seat 22 may be urged/forced generally forward and upward (see, e.g., force F1) and/or in the event of a rear-end collision or significant acceleration, the occupant may be urged/forced generally upward and/or rearward (see, e.g., force F2).

In embodiments, such as generally illustrated in FIG. 5, a seat belt/restraint 90 may be connected/anchored, at least indirectly (e.g., via a seat frame 22A), to a support member 50, 50' such that the forces associated with the occupant (e.g., in a loading event) may be transferred, at least in part, by the seat belt 90 to the support member 50. For example, upward/Z-direction forces transferred to the support member 50 (e.g., from the occupant by the seat belt 90) may cause the support member 50 to move upward relative to the track 30, which may result in the teeth 82A, 82B of the support member 50 moving in an upward direction into engagement with the apertures 80A, 80B of the track 30. During a loading event, the track 30 and/or the apertures 80A, 80B may remain in a substantially fixed position relative to the vehicle and/or the mounting surface 24.

In embodiments, when the track assembly 20 is in the loaded state, the first surface 84 of the teeth 82A, 82B may be disposed at least partially in and/or engage the apertures 80A, 80B (e.g., the first surface 84 may be in contact with an inner surface of the apertures 80A, 80B). Contact/engagement between the pluralities of teeth 82A, 82B and the pluralities of apertures 80A, 80B may limit movement of the seat 22 and/or the support members 50, 50' in at least one direction. For example and without limitation, contact/engagement between the first plurality of teeth 82A and the first plurality of apertures 80A, and/or between the second plurality of teeth 82B and the second plurality of apertures 80B may limit movement in a longitudinal (e.g., forward and/or rearward in an X-direction) and/or an upward direction (e.g., Z-direction). Such contact/engagement between the teeth 82A, 82B and the apertures 80A, 80B may limit relative movement between the track 30 and the support member 50 with more force than the motor 40. For example and without limitation, contact/engagement between the teeth 82A, 82B, and the aperture 80A, 80B may provide a holding force of at least about 35 KN, which may be at least 50% greater than the holding force of the motor 40 (e.g., a holding force of the motor 40 may be about 20 KN). One or more teeth 82A, 82B may be configured to engage the pluralities of apertures 80A, 80B to absorb and/or manage a majority of forces resulting from a loading/crash event such that the motors 40, 40' may not be responsible for limiting substantial movement of the support members 50, 50' in a loading/crash event.

In embodiments, when a track assembly 20 is in a loaded state, at least a portion of the pluralities of teeth 82A, 82B may be disposed in or above (e.g., in the Z-direction) the second horizontal portion 62A, 62B, such as by a distance D3, which may, for example and without limitation, be about 1.5 mm or more or less (see, e.g., FIG. 6B). After a crash/loading event has ended, the track assembly 20 may transition from the loaded state to the unloaded state. As the track assembly 20 transitions to the unloaded state, the second surface 86 of the pluralities of teeth 82A, 82B may facilitate movement to the unloaded state. For example and without limitation, the ramped shape of the second surfaces 86 of the pluralities of teeth 82A, 82B may facilitate a downward (e.g., Z-direction) movement of the first support member 50 to the unloaded state/position. The teeth 82A, 82B may be configured to engage the apertures 80A, 80B to limit movement in a forward direction and/or a rearward direction.

Figure 9:
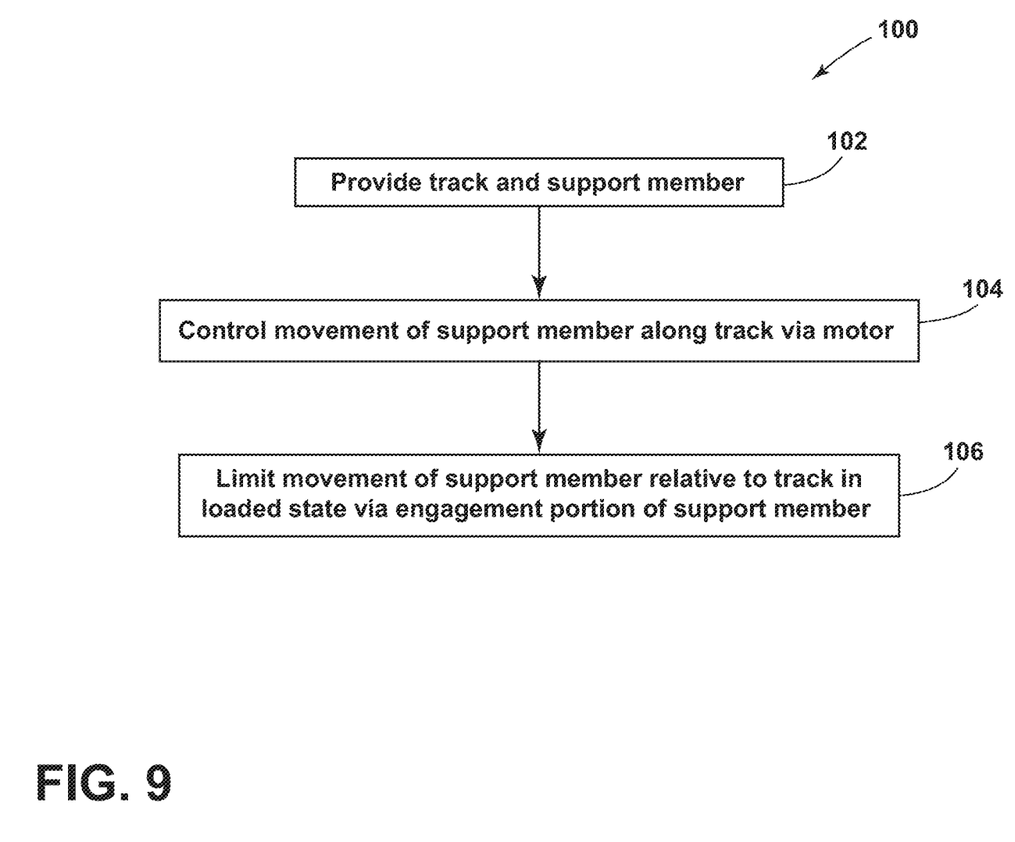
FIG. 9 is a flow chart generally illustrating an embodiment of a method of operating a track assembly according to teachings of the present disclosure.

With embodiments, such as generally illustrated in FIG. 9, a method 100 of operating a track assembly 20 may include providing a first track 30 and/or a first support member 50 (step 102). The support member 50 may include an engagement portion 52A, 52B that may be configured to engage at least a portion of the track 30. The method 100 may include controlling movement of the first support member 50 along the track 30 (e.g., forward/rearward in an X-direction) via a motor 40 that may be connected to the first support member 50 (step 104). The method 100 may include limiting movement of the first support member 50 relative to the track 30 in a loaded state (e.g., a crash event) via the engagement portion 52A, 52B at least partially engaging the first track 30 (step 106). The engagement portion 52A, 52B may include a first plurality of teeth 82A and/or a second plurality of teeth 82B that may extend substantially in a vertical direction and/or may be disposed at least partially in the first plurality of apertures 80A and/or a second plurality of apertures 80B, respectively, of the first track 30 in the loaded state. Limiting movement of the first support member 50 may include one or more teeth 82A, 82B (e.g., first surfaces 84 of teeth 82A, 82B) engaging one or more apertures 80A, 80B. The first plurality of teeth 82A and/or the second plurality of teeth 84A may be substantially ramp-shaped. One or more of first plurality of teeth 82A and/or the second plurality of teeth 82B may be disposed at least partially above (e.g., extend beyond), such as, for example, about 1.5 mm above, the first plurality of apertures 80A and/or the second plurality of apertures 80B in the loaded state (e.g., while limiting movement of the support member 50). The first plurality of teeth 82A may be configured to be disposed about 0.9 mm, for example and without limitation, below the first plurality of apertures 80A in an unloaded state. The method 100 may include the engagement portion 52A, 52B not materially limiting movement of the first support member 50 relative to the first track 30 in an unloaded state.

In embodiments, a motor 40 may be configured to limit unintended movement of a support member 50 relative to a track 30 up to a first threshold of force, such as in an unloaded state of a track assembly 20. The first threshold may, for example and without limitation, be about 20 KN. Engagement between an engagement portion 52A, 52B of the support member 50 and the track may be configured to limit unintended movement of the support member up to a second threshold force, which may be greater than the first threshold force, such as in a loaded state (e.g., a crash state). The second threshold force may, for example and without limitation, be about 35 KN.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A track assembly, comprising:
a track including:
an outer vertical track portion, an inner vertical track portion, an upper horizontal track portion, and a lower horizontal track portion that at least partially define a channel; and
a plurality of apertures disposed in the upper horizontal track portion and extending over substantially an entire length of the upper horizontal track portion in a longitudinal direction of the track;
a support member connected to and configured to move along the track;
wherein the support member includes an engagement portion and a rolling member;
the rolling member is configured to facilitate movement of the support member along the track;
the rolling member is connected to an outer vertical portion of the engagement portion and is disposed at least partially in the channel and between the outer vertical portion of the engagement portion and the outer vertical track portion;
the engagement portion includes a plurality of teeth disposed over substantially an entire length of the engagement portion along the support member in the longitudinal direction of the track, wherein a number of the plurality of teeth is less than a number of the plurality of apertures;
the engagement portion is configured to engage the track to limit relative movement between the track and the support member in a loaded state of the track assembly;
the engagement portion is configured not to operatively engage the track or limit movement between the track and the support member in an unloaded state of the track assembly; and
in response to an occurrence of a loading event:
the track assembly transitions from the unloaded state to the loaded state; and
a force provided by the loading event is transferred to the support member and moves substantially the entire support member toward the upper horizontal track portion engaging the plurality of teeth with at least a subset of apertures of the plurality of apertures.

2. The track assembly of claim 1, wherein:
the rolling member is rotatably connected to the engagement portion.

3. The track assembly of claim 1, wherein:
the support member is connected to a seat belt; and
the force provided by the loading event is transferred to the support member via the seat belt.

4. The track assembly of claim 1, wherein, when the track assembly is in the loaded state, the plurality of teeth are disposed partially within the subset of apertures and extend above the upper horizontal track portion.

5. The track assembly of claim 1, wherein when the track assembly is in the unloaded state, the plurality of teeth are not disposed in the plurality of apertures and are disposed below the upper horizontal track portion.

6. The track assembly of claim 1, wherein:
the engagement portion includes the outer vertical portion, an inner vertical portion, and a horizontal portion disposed in a substantially U-shaped configuration;
the outer vertical track portion connects the upper horizontal track portion and the lower horizontal track portion; and
the inner vertical track portion projects from the upper horizontal track portion toward the lower horizontal track portion.

7. The track assembly of claim 6, wherein:
the support member is connected to a motor;
the track includes a gear rack connected to an outer side of the outer vertical track portion;
an output portion of the motor is engaged with the gear rack; and
actuating the motor in the unloaded state moves the support member along the track via the gear rack.

8. The track assembly of claim 7, wherein:
engagement between the output portion and the gear rack provides a first holding force of about 20 KN; and
engagement between the plurality of teeth and the subset of apertures provides a second holding force of at least about 35 KN.

9. The track assembly of claim 6, wherein
the plurality of teeth are substantially ramp shaped.

10. The track assembly of claim 9, wherein:
the lower horizontal track portion is disposed substantially below the upper horizontal track portion;
the horizontal portion of the engagement portion is disposed between the lower horizontal track portion and the upper horizontal track portion;
the rolling member is disposed spaced apart from the upper horizontal track portion; and
the rolling member is in contact with and configured to roll along the lower horizontal track portion to facilitate movement of the support member along the track.

11. The track assembly of claim 10, wherein
the outer vertical portion of the engagement portion is disposed between the rolling member and the inner vertical track portion.

12. The track assembly of claim 1, wherein the support member is connected to a motor;
the track includes a drive portion;
an output portion of the motor is engaged with the drive portion; and
actuating the motor in the unloaded state moves the support member along the track via the drive portion.

13. The track assembly of claim 12, wherein engagement between the output portion and the drive portion is configured to provide a first holding force; and
engagement between the engagement portion and the track is configured to provide a second holding force that is greater than the first holding force.

14. The track assembly of claim 13, wherein the first holding force is about 20 KN and the second holding force is about 35 KN.

15. The track assembly of claim 14, wherein the motor and the drive portion are substantially disposed on a side of the track.

16. A method of operating the track assembly of claim 1, the method comprising:
controlling movement of the support member along the track, via a motor connected to the support member, in the unloaded state of the track assembly;
limiting movement of the support member relative to the track in the loaded state via the engagement portion at least partially engaging the track; and
in response to the occurrence of the loading event:
transitioning from the unloaded state to the loaded state; and
moving the support member toward the upper horizontal track portion to engage the plurality of teeth with the subset of apertures via transferring the force provided by the loading event to the support member.

17. The method of claim 16, including not limiting movement of the support member relative to the track in the unloaded state via the engagement portion.

18. The method of claim 16, wherein:
the support member is connected to a seat belt; and
transferring the force provided by the loading event to the support member includes transferring the force from the loading event to the support member via the seat belt.

19. The method of claim 16, wherein, during limiting movement of the support member relative to the track in the loaded state, at least one of the plurality of teeth extends at least about 1 mm above a respective aperture of the plurality of apertures; and
during controlling movement of the support member along the track via the motor, the at least one of the plurality of teeth is disposed at least about 0.9 mm below the respective aperture.

20. A track assembly, comprising:
a track including a first side portion, a second side portion, and a base portion connecting the first side portion and the second side portion in a generally U-shaped configuration; and
a support member connected to and movable along the track;
wherein the first side portion and the second side portion of the track each include:
a lower horizontal track portion connected to the base portion;
an upper horizontal track portion;
an outer vertical track portion connecting the upper horizontal track portion and the lower horizontal track portion; and
an inner vertical track portion projecting from the upper horizontal track portion toward the lower horizontal track portion;
the upper horizontal track portion of the first side portion of the track includes a plurality of first apertures extending over substantially an entire length of the upper horizontal track portion of the first side portion in a longitudinal direction of the track;
the upper horizontal track portion of the second side portion of the track includes a plurality of second apertures extending over substantially an entire length of the upper horizontal track portion of the second side portion in the longitudinal direction of the track;
the support member includes a rolling member configured to facilitate movement of the support member along the track, and a first engagement portion and a second engagement portion that are disposed at least partially between the first side portion and the second side portion of the track such that the first engagement portion and the second engagement portion are spaced apart;
the first engagement portion and the second engagement portion each include an outer vertical portion, an inner vertical portion, and a horizontal portion disposed in a generally U-shaped configuration;
the first engagement portion includes a plurality of first teeth projecting vertically from the outer vertical portion of the first engagement portion and disposed over substantially an entire length of the first engagement portion along the support member in the longitudinal direction of the track, wherein a number of the plurality of first teeth is less than a number of the plurality of first apertures;
the second engagement portion includes a plurality of second teeth projecting vertically from the outer vertical portion of the second engagement portion and are disposed over substantially an entire length of the second engagement portion along the support member in the longitudinal direction of the track, wherein a number of the plurality of second teeth is less than a number of the plurality of second apertures; and
in response to an occurrence of a loading event, a force provided by the loading event is transferred to the support member and moves the support member away from the base portion of the track (i) engaging the plurality of first teeth with at least a subset of the plurality of first apertures and (ii) engaging the plurality of second teeth with at least a subset of the plurality of second apertures to limit relative movement between the support member and the track.

* * * * *